United States Patent [19]
Wisor

[11] Patent Number: 6,076,160
[45] Date of Patent: Jun. 13, 2000

[54] HARDWARE-BASED SYSTEM FOR ENABLING DATA TRANSFERS BETWEEN A CPU AND CHIP SET LOGIC OF A COMPUTER SYSTEM ON BOTH EDGES OF BUS CLOCK SIGNAL

[75] Inventor: Michael T. Wisor, Austin, Tex.

[73] Assignee: Advanced Micro Devices, Inc., Sunnyvale, Calif.

[21] Appl. No.: 08/974,970

[22] Filed: Nov. 20, 1997

[51] Int. Cl.[7] .................................................... G06F 9/00
[52] U.S. Cl. ................... 713/1; 713/100; 710/104
[58] Field of Search .................................. 713/1, 2, 100, 713/322, 400, 501, 600; 709/220, 221, 222; 365/201; 714/400; 370/359; 395/309; 710/104, 10, 11, 21, 100, 117, 62

[56] References Cited

U.S. PATENT DOCUMENTS

| | | | |
|---|---|---|---|
| 4,539,677 | 9/1985 | Lo | 370/85 |
| 4,964,141 | 10/1990 | Matsushima et al. | 375/106 |
| 4,999,769 | 3/1991 | Costes et al. | 364/200 |
| 5,181,201 | 1/1993 | Schauss et al. | 370/359 |
| 5,245,575 | 9/1993 | Sasaki et al. | 365/189.12 |
| 5,502,678 | 3/1996 | McClure | 365/201 |
| 5,630,146 | 5/1997 | Conary et al. | 713/321 |
| 5,745,794 | 4/1998 | Poloniewicz et al. | 710/62 |
| 5,764,966 | 6/1997 | Mote, Jr. | 713/400 |
| 5,826,068 | 10/1998 | Gates | 713/600 |
| 5,875,312 | 12/1996 | Walsh et al. | 395/309 |
| 5,987,365 | 11/1999 | Okamoto | 701/29 |

*Primary Examiner*—Joseph E. Palys
*Assistant Examiner*—RiJue Mai
*Attorney, Agent, or Firm*—Conley, Rose & Tayon, PC; B. Noel Kivlin

[57] ABSTRACT

A hardware-based system for configuring a CPU and chip set logic of a computer system to allow data transfers on both the rising and falling edges of a bus clock signal. The CPU and chip set logic each include bus communication circuitry for transferring data, a storage unit, and a configuration circuit. The contents of the storage unit determine whether the respective bus communication circuitry transfers data on only one or on both clock edges. Initially, the bus communication circuits transfer data on only one clock edge. The configuration circuits of the CPU and chip set logic are connected by a single signal line and participate in a serial exchange of signals over the single signal line. The configuration circuits modify the contents of the respective storage units dependent upon an outcome of the serial exchange of signals. The configuration circuit of the CPU initiates the exchange of signals, transmitting a query signal. Upon receiving the query signal, the chip set logic configuration circuit transmits a response signal and modifies the contents of the chip set logic storage unit such that the chip set logic bus communication circuitry transfers data on both clock edges. Upon receiving the response signal from the chip set logic, the CPU configuration circuit modifies the contents of the CPU storage unit such that the CPU bus communication circuitry transfers data on both clock edges. As a result, data transfers on both clock edges are implemented within the computer system.

19 Claims, 4 Drawing Sheets

Fig. 5

HARDWARE-BASED SYSTEM FOR ENABLING DATA TRANSFERS BETWEEN A CPU AND CHIP SET LOGIC OF A COMPUTER SYSTEM ON BOTH EDGES OF BUS CLOCK SIGNAL

BACKGROUND OF THE INVENTION

1. Field of Invention

This invention relates to computer systems, and more particularly to the detection and initialization of computer system components.

2. Description of Related Art

Computer systems typically include hardware dependent software which must be valid when electrical power is applied to the systems. Such software includes instructions which initialize system hardware components (e.g., interrupt controller, direct memory access controller, and serial port) and provide a basic input and output system (BIOS). The BIOS provides an interface between system software and hardware (e.g., core logic chip set, graphics controller, keyboard, and disk drives). Computer system software programs typically access system hardware components using the BIOS.

A typical computer system includes a microprocessor which functions as a central processing unit (CPU). The microprocessor is coupled to chip set logic which functions as an interface between the microprocessor and a system memory configured to store data, and between the microprocessor and an expansion bus adapted for coupling to one or more peripheral devices. During system initialization (i.e., at "boot" time), the BIOS must search for and detect the presence and capabilities of various system components, including the chip set logic. Computer system components are typically assigned address ranges within the set of all addresses which may be produced by the CPU (i.e., the memory space of the CPU). The BIOS typically detects the presence of a system component by reading a recognized value from an address within the assigned address range. The address is typically the address of an "addressable" of "memory-mapped" configuration register containing, for example, an identification (ID) code assigned to the manufacturer of the component. Additional addressable configuration registers, located at other known addresses, contain identification codes which specifically identify the component (e.g., device ID, revision ID, etc.). The specific identity of a component reveals its operational capabilities (i.e., its "features") and determines how the component may be configured to operate within the computer system.

Data transfers between computer system components are typically synchronized by a bus clock signal. Circuitry to allow data transfers between components on both the '0' to '1' and '1' to '0' transitions of the bus clock signal (i.e., both "edges" of the bus clock signal) are well known in the art. In order for a CPU and chip set logic to transfer data on both edges of a bus clock signal, the CPU and chip set logic must both include the required support circuitry, and the support circuitry of both devices must be operating at the same time. At system boot time, the BIOS software typically checks for the presence of the requisite support circuitry in the CPU and the chip set logic. If the CPU and chip set logic both have the required support circuitry, the BIOS configures the CPU and the chip set logic such that the support circuits of both components are enabled.

Due to the increasing complexity of modern computer systems, BIOS configuration of computer systems at boot time is taking longer and longer. It would thus be advantageous to have a hardware-based system and method for detecting the presence of circuitry supporting data transfers on both edges of a bus clock signal within the CPU and the chip set logic of a computer system. If both the CPU and the chip set logic include the required circuitry, the desired system would configure the CPU and the chip set logic such that the support circuits within both components are enabled. The hardware-based system and method would be much faster than BIOS software, thus reducing the amount of time required to initialize a computer system at system boot time.

SUMMARY OF THE INVENTION

The problems outlined above are in large part solved by a hardware-based system for configuring a CPU and chip set logic of a computer system to selectively allow data transfers between the CPU and chip set logic on both the rising and falling edges of a bus clock signal. One embodiment of the computer system includes a CPU and chip set logic, each having bus communication circuitry for data transfers, a storage unit, and a configuration circuit. The contents of the storage unit determine whether the bus communication circuitry of the respective component is configured to transfer data on only one or on both edges of the bus clock signal. Upon application of electrical power to the CPU and the chip set logic, values stored within the respective storage units configure the bus communication circuits to transfer data on only a single transition of the bus clock signal. The configuration circuits of the CPU and the chip set logic are connected by a single signal line, and participate in a serial exchange of signals over the signal line. The configuration circuit modifies the contents of the respective storage unit dependent upon an outcome of the serial exchange of signals. The storage unit may be, for example, a configuration register.

In one embodiment, the exchange of signals includes a query signal and a response signal. The configuration circuit of the CPU initiates the exchange of signals, transmitting the query signal to determine if the chip set logic also includes bus communication circuitry capable of transferring data on both clock edges. Upon receiving the query signal, the configuration circuit of the chip set logic transmits the response signal and modifies the contents of the storage unit of the chip set logic such that the chip set logic bus communication circuitry is configured to transfer data on both edges of the bus clock signal. Upon receiving the response signal from the chip set logic, the configuration circuit of the CPU modifies the contents of the storage unit of the CPU such that the CPU bus communication circuitry is configured to transfer data on both edges of the bus clock signal. As a result, data transfers on both edges of the bus clock signal are implemented within the computer system. If either the CPU or the chip set logic does not support data transfers on both clock edges, data transfers continue to be carried out on the single transition of the bus clock signal.

In one embodiment, each configuration circuit includes a control circuit and an interface circuit. The control circuit is coupled to the storage unit and controls the functions of the configuration circuit. The control circuit is either an initiator control circuit or a responder control circuit. An initiator control circuit initiates the exchange of signals by issuing the query signal and waiting for the response signal. A responder control circuit waits for the query signal and issues the response signal upon receiving the query signal. The control circuit preferably embodies a state machine. The control circuit modifies the contents of the storage unit dependent upon the outcome of the serial exchange of signals. The interface circuit is coupled between the control circuit and the signal line. The interface circuit alternately drives signals upon and receives signals from the signal line.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
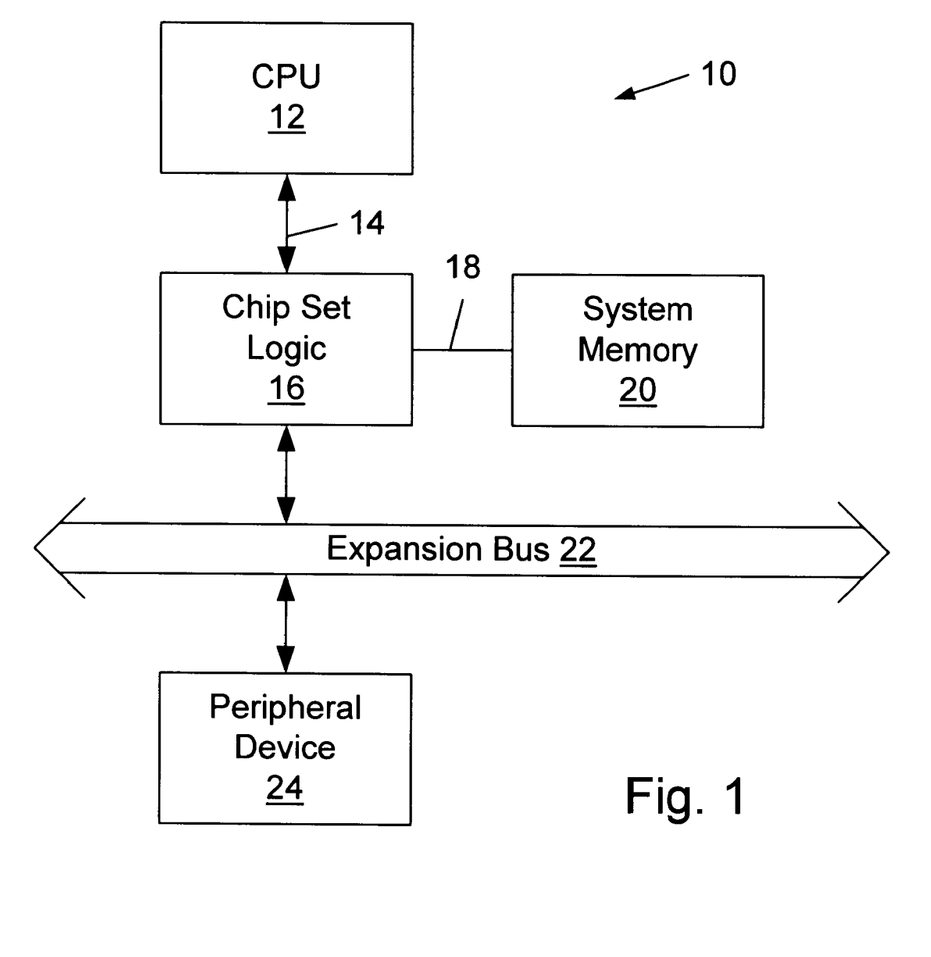
FIG. 1 is a block diagram of one embodiment of a computer system in accordance with the present invention, wherein the computer system includes a central processing unit (CPU) coupled to chip set logic via a processor bus.

Turning now to the figures, FIG. 1 is a block diagram of one embodiment of a computer system 10 in accordance with the present invention. Computer system 10 includes a CPU 12, a processor bus 14, chip set logic 16, a memory bus 18, a system memory 20, and an expansion bus 22. CPU 12 is configured to execute instructions, preferably x86 instructions. Processor bus 14 couples CPU 12 to chip set logic 16. Chip set logic 16 is also coupled to memory bus 18 and expansion bus 22. System memory 20 is coupled to memory bus 18 and is configured to store data. Chip set logic 16 functions as interface between CPU 12 and expansion bus 22, and between CPU 12 and system memory 20. Chip set logic 16 preferably includes a memory controller. System memory 20 preferably includes one or more non-volatile memory devices containing BIOS software. CPU 12 obtains instructions and data (i.e., reads) from system memory 20 via chip set logic 16, and stores data (i.e., writes) within system memory 20 via chip set logic 16. Expansion bus 22 is adapted for coupling to one or more peripheral devices. For example, a peripheral device 24 may be coupled to expansion bus 22. Peripheral device 24 may be, for example, a disk drive unit, a video display unit, or a printer. CPU 12 exchanges data (i.e., communicates) with peripheral device 24 via chip set logic 16.

Figure 2:
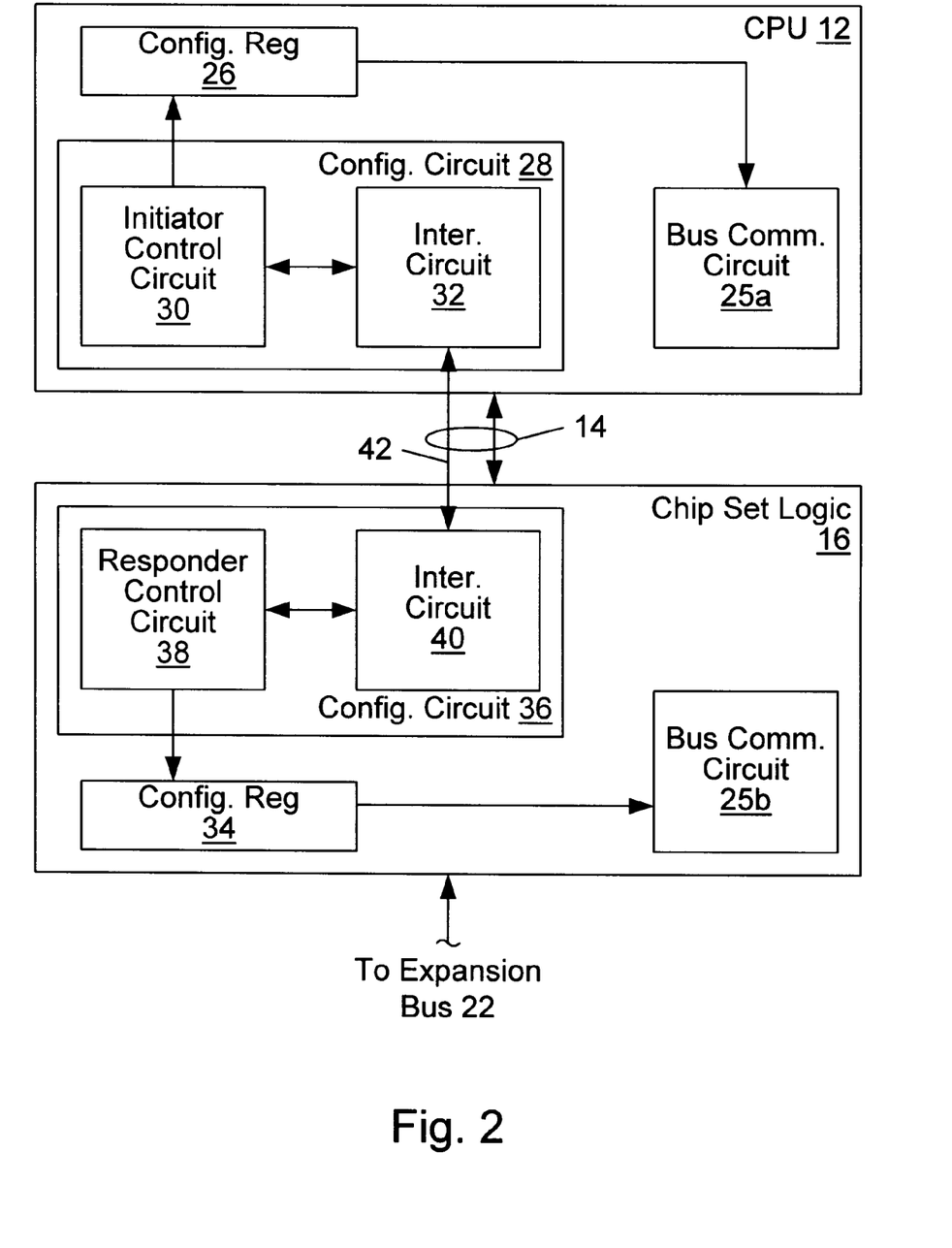
FIG. 2 is block diagram illustrating one embodiment of the hardware-based bus communication detection and configuration system of the present invention, wherein the CPU and the chip set logic both include bus communication circuits for transferring data, configuration registers containing values which determine whether the bus communication circuits are configured to transfer data on only one or on both edges of a processor bus clock signal, and configuration circuits coupled by a single signal line which modify the contents of the storage units based upon an outcome of a serial exchange of signals over the signal line.

FIG. 2 is block diagram illustrating one embodiment of the hardware-based bus communication detection and configuration system of the present invention. CPU 12 includes a bus communication circuit 25a, and chip set logic 16 includes a separate bus communication circuit 25b. It is noted that CPU 12 includes additional circuitry (not shown) to implement various functionality. Bus communication circuits 25a–b perform predefined functions in order to implement two data transfer modes. In a first data transfer mode, data is only transferred on only a single edge of the processor clock signal. In a second data transfer mode, data transfers occur on both edges of the processor bus clock signal. Upon application of electrical power to bus communication circuits 25a–b, both circuits enter the default first mode, and all data transfers occur on only one edge of the processor clock signal. A configuration circuit 28 of CPU 12 and a configuration circuit 36 of chip set logic 16 are connected by a single signal line 42 of processor bus 14, and participate in a serial exchange of signals in order to initiate data transfers on both edges of the processor clock signal (i.e., transitions from the first data transfer mode to the second data transfer mode). Signal line 42 may be an existing signal line of processor bus 14 or an added signal line dedicated for system configuration. The outcome of the signal exchange determines whether bus communication circuits 25a and 25b transfer data on only one or on both edges of the processor bus clock signal.

CPU 12 includes a configuration register 26, the contents of which determine whether bus communication circuit 25a operates in the first or the second data transfer mode. Chip set logic 16 includes a configuration register 34, the contents of which determine whether bus communication circuit 25b operates in the first or the second data transfer mode. Configuration circuit 28 is used to cause bus communication circuit 25a to transition from the default first mode to the second mode, and configuration circuit 36 is used to cause bus communication circuit 25b to transition from the default first mode to the second mode. Configuration circuit 28 includes an initiator control circuit 30 and an interface circuit 32. Configuration circuit 36 includes a responder control circuit 38 and an interface circuit 40.

Initiator control circuit 30 of configuration circuit 28 initiates the serial exchange of signals in order to determine if chip set logic 16 includes bus communication circuit 25b. Initiator control circuit 30 modifies the contents of configuration register 26 dependent upon the outcome of the signal exchange. Similarly, responder control circuit 34 modifies the contents of configuration register 34 dependent upon the outcome of the signal exchange. Interface circuits 32 and 40 drive signals upon and receive signals from signal line 42 of processor bus 14.

Figure 3A:
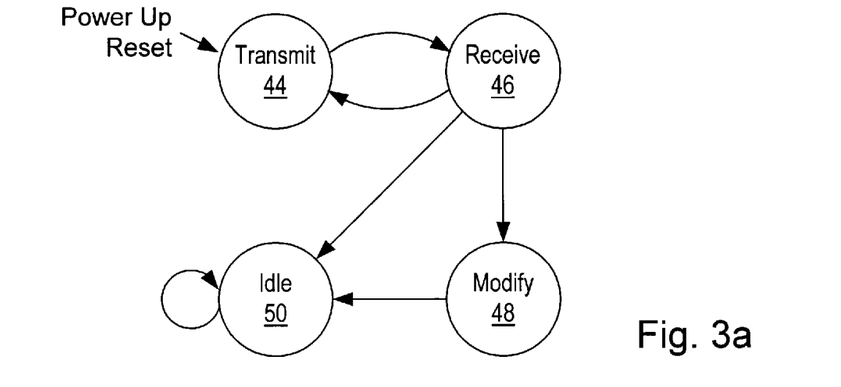
FIG. 3a is a state diagram of one embodiment of an initiator control circuit included within the configuration circuit of the CPU of FIG. 2.
Figure 3B:
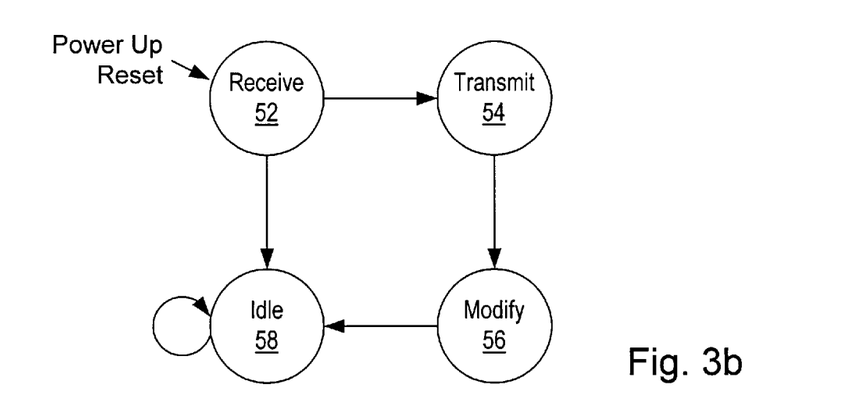
FIG. 3b is a state diagram of one embodiment of a responder control circuit included within the configuration circuit of the chip set logic of FIG. 2.

Initiator control circuit 30 and responder control circuit 38 preferably embody state machines. FIG. 3a is a state diagram of one embodiment of initiator control circuit 30, and FIG. 3b is a state diagram of one embodiment of responder control circuit 38. Upon application of electrical power (i.e., power up reset), initiator control circuit 30 enters a transmit state 44 and responder control circuit 38 enters a receive state 52. In transmit state 44, initiator control circuit 30 transmits a predefined query signal to responder control circuit 38 via signal line 42. The purpose of the query signal is to determine if chip set logic 16 includes bus communication circuit 25b. Following transmission of the query signal, initiator control circuit 30 transitions to a receive state 46 for a predetermined period of time. In receive state 46, initiator control circuit 30 "listens" for a predefined response signal from responder control circuit 38.

Upon detecting the query signal, responder control circuit 38 transitions from receive state 52 to a transmit state 54. Responder control circuit 38 transmits the response signal upon signal line 42 while in the transmit state. After transmitting the response signal, responder control circuit 38 transitions to a modify state 56. Transmission of the query signal by initiator control circuit 30 signifies that CPU 12 includes bus communication circuit 25a. In modify state 56, responder control circuit 30 modifies the contents of configuration register 34 of chip set logic 16 to cause bus communication circuit 25b to transfer from the first mode to the second mode (i.e., to enable data transfers on both edges of the processor clock signal). Once configuration register 34 has been modified, responder control circuit 38 transitions to an idle state 58. Responder control circuit 38 remains in idle state 58 until the power up reset signal is asserted.

Upon detecting the response signal, initiator control circuit 30 transitions from receive state 46 to a modify state 48. Transmission of the response signal by response control circuit 38 signifies that chip set logic 16 includes bus communication circuit 25b. In modify state 48, initiator control circuit 30 modifies the contents of configuration register 26 of CPU 12 to cause bus communication circuit 25a to transfer from the first data transfer mode to the second data transfer mode (i.e., to enable data transfers on both edges of the processor clock signal). Once configuration register 26 has been modified, initiator control circuit 30 transitions to an idle state 50. Initiator control circuit 30 remains in idle state 50 until the power up reset signal is asserted.

If, while in receive state 46, initiator control circuit 30 does not receive the response signal within a predetermined period of time, initiator control circuit 30 transitions back to transmit state 44, transmits the query signal again, and transitions back to receive state 46. After transmitting the query signal a certain number of times (e.g., 3 times) without receiving the response signal, initiator control circuit 30 transitions to idle state 50 and remains in idle state 50 until the power up reset signal is asserted. Failure of responder control circuit 38 to transmit the response signal signifies that chip set logic 16 does no include bus communication circuit 25b. Accordingly, initiator control circuit 30 does not enter modify state 48 and does not modify the contents of configuration register 26. As a result, bus communication circuit 25a remains in the first data transfer mode and data transfers over processor bus 14 occur only on the rising (or falling) edge of the processor clock signal.

If, while in receive state 52, responder control circuit 38 does not receive the query signal within a predetermined period of time, responder control circuit 38 transitions to idle state 58 and remains in idle state 58 until the power up reset signal is asserted. Failure of initiator control circuit 30 to transmit the query signal signifies that CPU 12 does not include the capability to operate in the second mode (i.e., to transfer data on both edges of the processor bus signal). Accordingly, responder control circuit 38 does not enter modify state 56 and does not modify the contents of configuration register 34. As a result, bus communication circuit 25b remains in the first data transfer mode and data transfers over processor bus 14 occur only on the rising (or falling) edges of the processor clock signal.

Figure 4A:
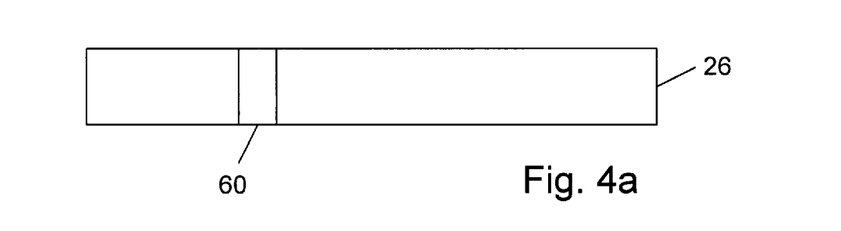
FIG. 4a is a block diagram of one embodiment of the configuration register of the CPU, wherein the configuration register includes a processor bus communication bit, and wherein the value stored within processor bus communication bit determines whether the bus communication circuit of the CPU is configured to transfer data on only one or on both edges of the processor bus clock signal.

FIG. 4a is a block diagram of one embodiment of configuration register 26 of CPU 12. Configuration register 26 includes a processor bus communication bit 60. The value stored within processor bus communication bit 60 determines if bus communication circuit 25a of CPU 12 operates in the first or the second data transfer mode. For example, if the processor bus communication bit 60 contains a '0', bus communication circuit 25a operates in the first data transfer mode. If processor bus communication bit 60 contains a '1', bus communication circuit 25a operates in the second data transfer mode. In this case, the default value of processor bus communication bit 60 is '0', and data transfers over processor bus 14 occur only on the rising (or falling) edges of the processor clock signal. Only configuration circuit 28 may change the value of processor bus communication bit 60 from a '0' to a '1'. This action is taken only after initiator control circuit 30 transmits the query signal and responder control circuit 38 issues the response signal signifying bus communication circuit 25b of chip set logic 16 includes the capability to transfer data on both edges of the processor clock signal.

Figure 4B:
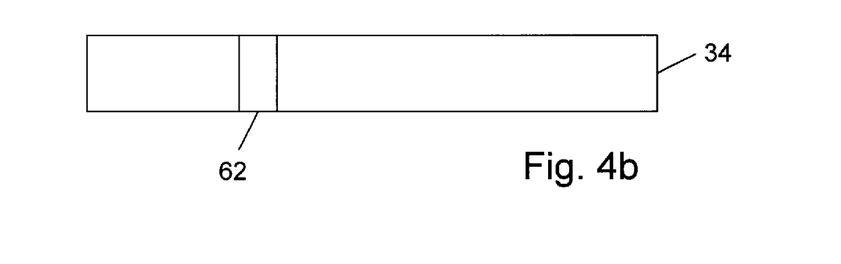
FIG. 4b is a block diagram of one embodiment of the configuration register of the chip set logic, wherein the configuration register includes a processor bus communication bit, and wherein the value stored within processor bus communication bit determines whether the bus communication circuit of the chip set logic is configured to transfer data on only one or on both edges of the processor bus clock signal.

FIG. 4b is a block diagram of one embodiment of configuration register 34 of chip set logic 16. Configuration register 34 includes a processor bus communication bit 62. The value stored within processor bus communication bit 62 determines if bus communication circuit 25b of chip set logic 16 operates in the first mode or the second mode. For example, if processor bus communication bit 62 contains a '0', bus communication circuit 25b operates in the first data transfer mode. If processor bus communication bit 62 contains a '1', bus communication circuit 25b operates in the second data transfer mode. As with processor bus communication bit 60 of configuration register 26, the default value of processor bus communication bit 62 is '0', and data transfers over processor bus 14 occur only on the rising (or falling) edges of the processor clock signal. Only configuration circuit 36 may change the value of processor bus communication bit 62 from a '0' to a '1'. Configuration circuit 36 takes this action only after responder control circuit 38 receives the query signal from initiator control circuit 30 signifying bus communication circuit 25a of CPU 12 includes the capability to transfer data on both edges of the processor clock signal.

Figure 5:
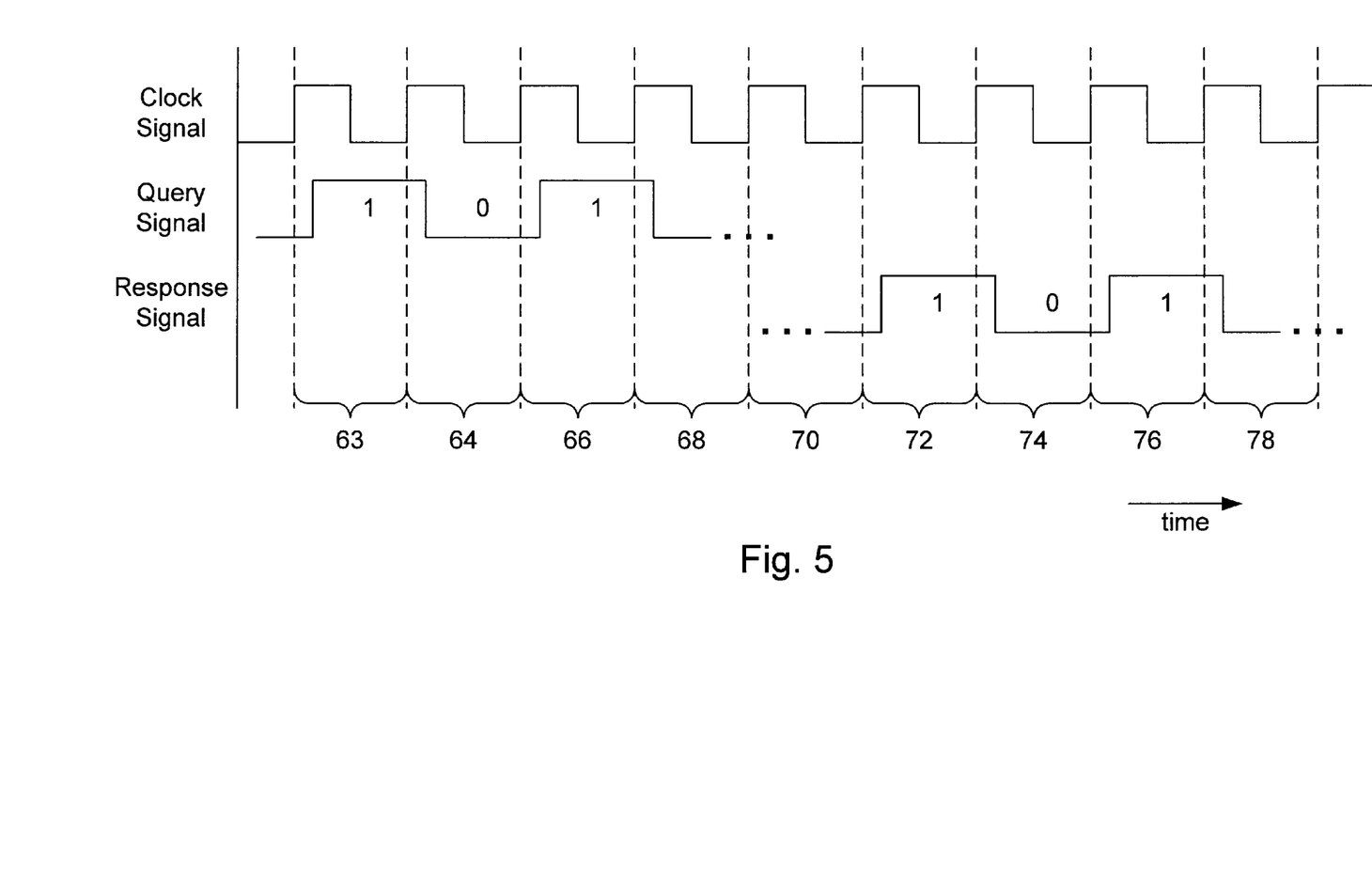
FIG. 5 is a timing diagram illustrating exemplary query and response signals involved in the serial exchange of signals.

FIG. 5 is a timing diagram illustrating exemplary query and response signals. The query and response signals are preferably synchronized to the processor bus clock signal. As shown in FIG. 5, the query signal is the sequence '101' driven upon signal line 42 of processor bus 14. The response signal is also the sequence '101'. Prior to a cycle 63 of the bus clock signal, neither interface circuit 32 of CPU 12 or interface circuit 40 of chip set logic 16 is driving signal line 42 of processor bus 14. Interface circuits 32 and 40 are both preferably in a "tristate" condition. During clock cycle 63, interface circuit 32 takes control of signal line 42 and drives a '1' onto signal line 42 in response to a control signal from initiator control circuit 30. At the rising edge of the bus clock signal at the beginning of clock cycle 64, responder control circuit 38 recognizes the '1' present upon signal line 42. During clock cycle 64, initiator control circuit 30 issues a control signal to interface circuit 32 which causes interface circuit 32 to drive a '0' upon signal line 42. At the rising edge of the bus clock signal at the beginning of clock cycle 66, responder control circuit 38 recognizes the '0' present upon signal line 42. During clock cycle 66, initiator control circuit 30 issues a control signal to interface circuit 32 which causes interface circuit 32 to drive a '1' upon signal line 42. At the rising edge of the bus clock signal at the beginning of clock cycle 68, responder control circuit 38 recognizes the '1' present upon signal line 42. During clock cycle 68, initiator control circuit 30 issues a control signal to interface circuit 32 which causes interface circuit 32 to stop driving signal line 42.

During clock cycle 70, initiator control circuit 30 transitions from transmit state 44 to receive state 46, and receptor control circuit 38 transitions from receive state 52 to transmit state 54. During clock cycle 72, interface circuit 40 takes control of signal line 42 and drives a '1' onto signal line 42 in response to a control signal from receptor control circuit 38. At the rising edge of the bus clock signal at the beginning of clock cycle 74, initiator control circuit 30 recognizes the '1' present upon signal line 42. During clock cycle 74, receptor control circuit 30 issues a control signal to interface circuit 40 which causes interface circuit 32 to drive a '0' upon signal line 42. At the rising edge of the bus clock signal at the beginning of clock cycle 76, initiator control circuit 30 recognizes the '0' present upon signal line 42. During clock cycle 76, receptor control circuit 38 issues a control signal to interface circuit 40 which causes interface circuit 40 to drive a '1' upon signal line 42. At the rising edge of the bus clock signal at the beginning of clock cycle 78, initiator control circuit 30 recognizes the '1' present upon signal line 42. During clock cycle 78, receptor control circuit 38 issues a control signal to interface circuit 40 which causes interface circuit 40 to stop driving signal line 42.

Following clock cycle 78, initiator control circuit 30 transitions from receive state 46 to modify state 48, and receptor control circuit 38 transitions from transmit state 54 to modify state 56. In the modify states, the control circuits modify the contents of the respective configuration registers as described above in order to implement data transfers on both the rising and falling edges of the processor bus clock signal.

Numerous variations and modifications will become apparent to those skilled in the art once the above disclosure is fully appreciated. It is intended that the following claims be interpreted to embrace all such variations and modifications.

What is claimed is:

1. A computer system, comprising:
    a central processing unit (CPU) configured to execute instructions, comprising:
        a first bus communication circuit having:
            a first data transfer mode effectuating data transfers on a single transition of a bus clock signal; and
            a second data transfer mode effectuating data transfers on both transitions of the bus clock signal;
        a first storage unit, wherein the contents of the first storage unit determine whether the first bus communication circuit operates in the first or second data transfer mode; and
        a first configuration circuit coupled to the first storage unit; and chip set logic coupled to the CPU, comprising:
        a second bus communication circuit having the first and second data transfer modes:
        a second storage unit, wherein the contents of the second storage unit determine whether the second bus communication circuit operates in the first or second data transfer mode; and
        a second configuration circuit coupled to the second storage unit;
    wherein a single signal line connects the first configuration circuit to the second configuration circuit, and wherein the first and second bus communications circuits are initially configured to operate in the first data transfer mode, and wherein the first and second configuration circuits participate in a serial exchange of signals over the signal line, and wherein the first configuration circuit modifies the contents of the first storage unit dependent upon an outcome of the serial exchange of signals, and wherein the second configuration circuit modifies the contents of the second storage unit dependent upon the outcome of the serial exchange of signals.

2. The computer system as recited in claim 1, wherein the first and second storage units comprise configuration registers.

3. The computer system as recited in claim 1, wherein the exchange of signals comprises a query signal and a response signal.

4. The computer system as recited in claim 3, wherein the first configuration circuit transmits the query signal, and wherein upon receiving the response signal after transmitting the query signal, the first configuration circuit modifies the contents of the first storage unit such that the first bus communication circuit is configured to operate in the second data transfer mode.

5. The computer system as recited in claim 3, wherein upon receiving the query signal, the second configuration circuit transmits the response signal and modifies the contents of the second storage unit such that the second bus communication circuit is configured to operate in the second data transfer mode.

6. The computer system as recited in claim 1, wherein the first configuration circuit comprises:
    an initiator control circuit coupled to the first storage unit, wherein the initiator control circuit controls the functions of the first configuration circuit and modifies the contents of the first storage unit dependent upon the outcome of the serial exchange of signals; and
    an interface circuit coupled to the initiator control circuit, wherein the interface circuit is configured to alternately drive a signal upon the signal line and to receive a signal from the signal line.

7. The computer system as recited in claim 6, wherein the initiator control circuit embodies a state machine.

8. The computer system as recited in claim 1, wherein the second configuration circuit comprises:
    an responder control circuit coupled to the second storage unit, wherein the responder control circuit controls the functions of the second configuration circuit and modifies the contents of the second storage unit dependent upon the outcome of the serial exchange of signals; and
    an interface circuit coupled to the responder control circuit, wherein the interface circuit is configured to alternately drive a signal upon the signal line and to receive a signal from the signal line.

9. The computer system as recited in claim 8, wherein the responder control circuit embodies a state machine.

10. A central processing unit (CPU), comprising:
   a bus communication circuit having:
      a first data transfer mode effectuating data transfers on a single transition of a bus clock signal; and
      a second data transfer mode effectuating data transfers on both transitions of the bus clock signal;
   a storage unit, wherein the contents of the storage unit determine whether the bus communication circuit operates in the first or second data transfer mode; and
   a configuration circuit, wherein during use the configuration circuit participates in a serial exchange of signals over a single signal line, and wherein the configuration circuit comprises:
      a control circuit coupled to the storage unit, wherein the control circuit controls the functions of the configuration circuit and modifies the contents of the storage unit dependent upon an outcome of the serial exchange of signals; and
      an interface circuit coupled to the control circuit, wherein the interface circuit is configured to alternately drive a signal upon the signal line and to receive a signal from the signal line.

11. The CPU as recited in claim 10, wherein the storage unit comprises a configuration register.

12. The CPU as recited in claim 10, wherein the serial exchange of signals comprises a query signal and a response signal.

13. The CPU as recited in claim 12, wherein the control circuit transmits the query signal, and wherein upon receiving the response signal via the interface circuit after transmitting the query signal, the control circuit modifies the contents of the storage unit such that the bus communication circuitry is configured to operate in the second data transfer mode.

14. The CPU as recited in claim 10, wherein the control circuit embodies a state machine.

15. A chip set logic system, comprising:
   a bus communication circuit having:
      a first data transfer mode effectuating data transfers on a single transition of a bus clock signal; and
      a second data transfer mode effectuating data transfers on both transitions of the bus clock signal;
   a storage unit, wherein the contents of the storage unit determine whether the bus communication circuit operates in the first or second data transfer mode; and
   a configuration circuit, wherein during use the configuration circuit participates in a serial exchange of signals over a single signal line, and wherein the configuration circuit comprises:
      a control circuit coupled to the storage unit, wherein the control circuit controls the functions of the configuration circuit and modifies the contents of the storage unit dependent upon an outcome of the serial exchange of signals; and
      an interface circuit coupled to the control circuit, wherein the interface circuit is configured to alternately drive a signal upon the signal line and to receive a signal from the signal line.

16. The chip set logic system as recited in claim 15, wherein the storage unit comprises a configuration register.

17. The chip set logic system as recited in claim 15, wherein the serial exchange of signals comprises a query signal and a response signal.

18. The chip set logic system as recited in claim 17, wherein upon receiving the query signal, the control circuit transmits the response signal via the interface circuit and modifies the contents of the storage unit such that the bus communication circuitry is configured to operate in the second data transfer mode.

19. The chip set logic system as recited in claim 15, wherein the control circuit embodies a state machine.

\* \* \* \* \*

UNITED STATES PATENT AND TRADEMARK OFFICE

CERTIFICATE OF CORRECTION

PATENT NO. : 6,076,160

DATED : June 13, 2000

INVENTOR(S) : Michael T. Wisor

It is certified that error appears in the above-identified patent and that said Letters Patent is hereby corrected as shown below:

Claim 13, col. 9, line 29, please insert "via the interface circuit," after "signal,".

Claim 13, col. 9, line 30, please delete "via the interface circuit".

Signed and Sealed this

Tenth Day of April, 2001

Attest:

NICHOLAS P. GODICI

Attesting Officer      Acting Director of the United States Patent and Trademark Office